Patented Jan. 12, 1943

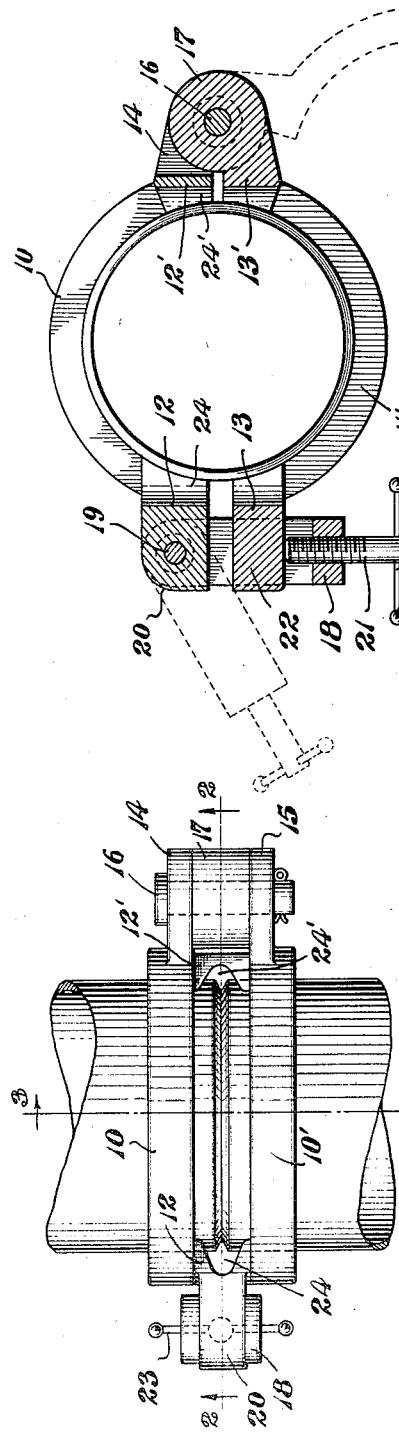

2,308,340

UNITED STATES PATENT OFFICE 2,308,340

PIPE WELDING CLAMP

George R. Newlon, Point Pleasant, W. Va., assignor to Marietta Manufacturing Company, Point Pleasant, W. Va., a corporation Application June 18, 1941, Serial No. 398,689

5 Claims. (Cl. 113—102)

This invention relates to welding clamps for use in welding pipe sections in aligned end-to-end relation, as for instance in the laying of oil and gas lines. Clamps of this type have spaced gripping portions which clamp the adjacent ends of the pipe sections and hold them in aligned relation while the weld is being made. It ofttimes happens that one or both ends of the pipe are out-of-round due to warpage or other causes, and to ensure an effective weld, the clamp must bring the ends of these sections in accurate registration and hold them in this position while the weld is made in the space between the gripping portions. It is also important that the clamp permit the making of a weld substantially complete in one operation, or around the entire circumferential area of the joint, else it becomes necessary to release the clamp and shift the latter or the pipe angularly to render unwelded portions accessible to the welding tool or torch.

An object of the present invention is to provide a welding clamp which will automatically align and hold the contiguous pipe ends in accurate aligned position throughout the welding operation, and which at the same time will enable the entire joint to be welded substantially complete in one operation.

Another object is to provide a welding clamp which is easily applied and released and is of rugged yet simple construction.

The foregoing and other objects and advantages will become apparent in view of the following description taken in conjunction with the drawing, wherein:

Fig. 1 is a plan view of a welding clamp in accordance with the invention shown in applied position;

Figs. 2 and 3 are sections on the lines 2—2 and 3—3, Fig. 1; and

Figs. 4 and 5 are fragmentary views illustrating modified clamp members.

Referring particularly to Figs. 1, 2 and 3, the improved clamp comprises hinged clamp members 10, 10' and 11, 11' which are of duplicate construction, each consisting of a semicircular bar coacting with a like member to clampingly engage the peripheral surfaces of the contiguous pipe ends and bring the latter in accurate registration. This results from the fact that the sets of clamping bars 10, 10' and 11, 11' provide spaced bands, one band for each pipe end, which make contact with the latter over substantially their entire peripheral area. The semicircular bars 10, 10' are joined at opposite ends by webs 12, 12' and 13, 13'. The webs 12', 13' have hinge lugs 14 and 15 projected outwardly therefrom through which a hinge pin 16 is projected, a spacing block 17 being mounted between the hinge lugs. The hinge pin may be removably held in position by means of a cotter key or the like. The ends of the clamping bars 10, 10' and 11, 11' opposite the hinged ends are provided with a clamping latch comprising a yoke 18 which at one end is journaled on a hinge pin 19 mounted in a boss 20 projecting outwardly from web 12, while the opposite end of the yoke 18 is formed with a threaded bore to receive a combined draw and latch screw bolt 21 adapted to engage boss 22 projecting outwardly from web 13, said screw bolt being provided with a handle 23.

It is important that the weld be made substantially complete in one operation. Accordingly, the webs 12, 12' and 13, 13' which join the opposite ends of the clamping bands are undercut or formed with clearance recesses 24, 24', note particularly Fig. 1, thereby rendering substantially the entire peripheral area of the joint accessible to the welding tool.

When it is desired to join a pair of pipe sections in end-to-end relation, the clamp is placed in open position about the contiguous pipe ends, the latter being spaced just sufficiently to provide an effective weld. The opposite sets of clamping bars are then closed about the pipe and the latch yoke 18 swung over the projecting end or boss 22, whereupon the screw bolt 21 is tightened down, drawing the said bars into flush clamping engagement with the peripheral surfaces of the contiguous pipe ends. There is thus no chance for the pipe to become distorted when the actual clamping operation takes place. In the event the said ends are warped or in a pronounced out-of-round condition, the clamping stress is relatively great, so that it is important that the clamping bars bind the pipe ends without permitting the latter to distort. The weld may then be made between the spaced clamping bars and also within the clearance spaces or recesses 24, 24'.

Figs. 4 and 5 show modified types of clamping and latch members. In Fig. 4 the boss 20a which projects outwardly from the upper set of clamping bars has pivotally connected thereto a latch bolt 25, adapted to project through a slot 26 formed in the boss 22a projecting from the lower set of clamping bars. A clamp screw 27 is threaded onto the bolt 22 and is adapted to engage in a countersunk recess 28 formed in the boss 22a around the slot. This type of combined clamping and latch member ensures an accurate positioning or centering of the upper and lower sets of clamp bars, due to the fact that as the nut 27 is tightened down, it automatically centers itself in the recess 28.

Fig. 5 illustrates a cam type of combined clamp and latch member. In this instance, the boss 20b projecting outwardly from the upper set of clamping bars has pivotally connected thereto a yoke 30 having a shaft 31 journaled in the lower or outer end thereof. A cam 32 is secured on shaft 31 and is adapted to engage boss 22b projecting outwardly from the lower set of clamping bars. An arm or lever 33 is secured on the one end of the shaft 31 and is provided with a handle 34. When the upper and lower sets of clamping bars are closed around the pipe ends, the yoke 30 carrying the cam 32 is swung from the dotted line position in Fig. 5 to the full line position, whereupon the lever 33 is turned in a clockwise direction, thereby tightening the clamp about the pipe ends. With this type of clamping and latch member considerable leverage can be obtained.

The improved welding clamp permits the welding operation to be carried out with relative ease. Once the clamp is tightened down, accurate registration of the pipe ends is ensured, while at the same time the said ends are held in non-displaceable welding relation.

It will be understood that certain limited changes in construction and design may be adopted without departing from the spirit and scope of the invention as defined by the appended claims.

What is claimed is:

1. A welding clamp for aligning and joining contiguous ends of pipe sections, comprising opposed sets of arcuate-shaped clamping bars, there being a pair of bars to each set spaced apart to provide a welding space therebetween around the welding joint, each set of bars being joined adjacent opposite ends only by web portions, the material of each web portion being formed with an undercut recess whereby the welding space is extended substantially completely around the joint, said bars each having pipe-engaging surfaces of substantially smooth unbroken contour to provide substantially flush contact with the exterior surfaces of the pipe ends and the space between the bars being sufficient to accommodate a welding tool while bringing the bars relatively close to the pipe ends to ensure accurate registration of said ends, hinge members formed adjacent one pair of said web portions and adjacent ends of the bars and outwardly projecting bosses formed adjacent the other web portions, and clamping means operatively connected to said bosses.

2. A welding clamp for aligning and joining contiguous ends of pipe sections, comprising oppositely bowed sets of hinged clamping bars, each set consisting of a pair of bars spaced axially to provide a substantially circumferential welding space therebetween around a joint to be welded, each set of bars being joined by web portions at opposite ends only, the material of the web portions being formed with an undercut arcuate recess to thereby extend the welding space substantially completely around the joint, said bars each having interior pipe-engaging surfaces of smooth substantially unbroken contour which extend for substantially the entire inner circumferential area of the clamp and the axial space between the bars being sufficient to accommodate a welding tool while bringing the bars relatively close to the pipe ends to ensure accurate registration of said pipe ends, hinge lugs adjacent the webs of the bars at the hinged ends of the latter, a hinge pin removably projected axially through said lugs, means adjacent the webs at the clamping ends of the bars projecting radially outwardly therefrom to provide a pair of clamping bosses, and clamping means operatively connected to said bosses.

3. A welding clamp for aligning and joining contiguous ends of pipe sections, comprising oppositely bowed sets of hinged clamping bars, each set consisting of a pair of bars spaced axially to provide a substantially circumferential welding space therebetween around a joint to be welded, each set of bars being joined by web portions at the end portions only, the material of the web portions being formed with an undercut recess functioning to extend the welding space substantially completely around the joint, said bars each having interior pipe-engaging surfaces of smooth substantially unbroken contour and the axial space between the bars being sufficient to accommodate a welding tool while bringing the bars relatively close to the pipe ends, radially projecting hinge elements adjacent the webs at the ends of the bars at the hinged ends of the latter, means adjacent the webs joining the clamping ends of the bars projecting outwardly therefrom to provide a pair of clamping bosses, a yoke pivoted to one of said bosses and adapted to be swung over the opposite boss, and a clamping screw threaded into said yoke for clamping engagement with said latter boss.

4. The structure defined in claim 1, in which the clamping means comprises a threaded bolt pivoted to one of said bosses and adapted to engage in and project through a slot formed in the other of said bosses, the boss around said slot being formed with a countersunk recess, and a clamp nut threaded onto said bolt for clamping engagement in said recess and whereby the opposed clamping bars are brought into accurate aligned clamping relation.

5. The structure defined in claim 1, in which the clamping means includes a yoke pivoted to one of said bosses and adapted to engage over the other of said bosses, a cam shaft mounted in said yoke and having a cam thereon adapted to engage said latter boss, and a lever connected to said shaft for rotating the latter.

GEORGE R. NEWLON.